United States Patent
Belligundu et al.

(10) Patent No.: US 12,417,606 B2
(45) Date of Patent: Sep. 16, 2025

(54) METHOD AND SYSTEM FOR ANOMALY DETECTION USING MULTIMODAL KNOWLEDGE GRAPH

(71) Applicant: Siemens Aktiengesellschaft, Munich (DE)

(72) Inventors: Suhas Belligundu, Karnataka (IN); Vinay Sudhakaran, Karnataka (IN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 58 days.

(21) Appl. No.: 17/773,165

(22) PCT Filed: Nov. 2, 2020

(86) PCT No.: PCT/EP2020/080686
§ 371 (c)(1),
(2) Date: Apr. 29, 2022

(87) PCT Pub. No.: WO2021/084125
PCT Pub. Date: May 6, 2021

(65) Prior Publication Data
US 2024/0153059 A1    May 9, 2024

(30) Foreign Application Priority Data
Oct. 31, 2019   (EP) ................... 19206513

(51) Int. Cl.
*G06V 10/20* (2022.01)
*G06T 7/00* (2017.01)
(Continued)

(52) U.S. Cl.
CPC ........... *G06V 10/20* (2022.01); *G06T 7/0004* (2013.01); *G06V 10/70* (2022.01); *G06V 10/764* (2022.01)

(58) Field of Classification Search
None
See application file for complete search history.

(56) References Cited

U.S. PATENT DOCUMENTS 6,035,305 A  *  3/2000  Strevey ............. G06Q 10/06
2011/0052068 A1 *  3/2011  Cobb .............. G06V 10/7715
                                                         382/190
(Continued)

FOREIGN PATENT DOCUMENTS

| CN | 110378381 | * 10/2019 | ............. G06K 9/62 |
| JP | 2003297888 | * 10/2003 | ............. G01B 11/30 |

OTHER PUBLICATIONS

Y. Wang, L. Gao, Y. Gao, X. Li and L. Gao, "Knowledge Graph-guided Convolutional Neural Network for Surface Defect Recognition," 2020 IEEE 16th International Conference on Automation Science and Engineering (CASE), Hong Kong, China, 2020, pp. 594-599, doi: 10.1109/CASE48305.2020.9216752. (Year: 2020).*

(Continued)

*Primary Examiner* — Beniyam Menberu
(74) *Attorney, Agent, or Firm* — Schmeiser, Olsen & Watts LLP (57) ABSTRACT

A method and system for detecting anomalies associated with a plurality of data objects of a technical installation is provided. The method includes receiving a request to detect anomaly associated with the plurality of data objects in an image data. The image data can be a static image data or a dynamic image data. The method includes classifying the plurality of data objects using a multimodal knowledge graph. The multimodal knowledge graph includes a plurality of pre-classified data objects, each of pre-classified data object is connected using one or more paths. Further, the method includes detecting whether anomaly exists in the plurality of classified data objects. The anomaly is detected by evaluating the plurality of classified data objects with (Continued)

reference data corresponding to the plurality of classified data objects obtained from the multimodal knowledge graph. Furthermore, the method includes generating a notification indicating the detected anomaly based on the evaluation.

9 Claims, 6 Drawing Sheets

(51) Int. Cl.
*G06V 10/70* (2022.01)
*G06V 10/764* (2022.01)

(56) References Cited

U.S. PATENT DOCUMENTS

| | | | | |
|---|---|---|---|---|
| 2016/0034784 | A1* | 2/2016 | Ohmura | G06T 7/254 |
| | | | | 382/103 |
| 2016/0055409 | A1* | 2/2016 | Majumdar | G06N 7/01 |
| | | | | 706/20 |
| 2016/0139977 | A1* | 5/2016 | Ashani | G06F 11/0706 |
| | | | | 714/26 |
| 2017/0293611 | A1* | 10/2017 | Tu | G06F 16/48 |
| 2018/0150701 | A1* | 5/2018 | Kang | G06F 18/2413 |
| 2018/0350053 | A1* | 12/2018 | Sugaya | G06T 7/001 |
| 2019/0197396 | A1* | 6/2019 | Rajkumar | B25J 9/1671 |
| 2021/0081698 | A1* | 3/2021 | Lindeman | G06Q 30/0283 |

OTHER PUBLICATIONS

F. Schroff et al: "Object Class Segmentation using Random Forests", Procedings of the British Machine Vision Conference 2008, Jan. 1, 2008 (Jan. 1, 2008), pp. 54.1-54.10, XP055264531, DOI: 10.5244/C.22.54 ISBN: 978-1-901725-36-0 the whole document.

Boykov Y et al: "Fast approximate energy minimization via graph cuts", IEEE Transactions on Pattern Analysis and Machine Intelligence, IEEE Computer Society, USA, vol. 23, No. 11, Nov. 1, 2001 (Nov. 1, 2001), pp. 1222-1239, XP011093916, ISSN: 0162-8828, DOI: 10.1109/34.969114 the whole document.

Faliu Yi et al: "Image segmentation: A survey of graph-cut methods", Systems and Informatics (ICSAI), 2012 International Conference on, IEEE, May 19, 2012 (May 19, 2012), pp. 1936-1941, XP032192906, DOI: 10.1109/ICSAI.2012.6223428 ISBN: 978-1-4673-0198-5 the whole document.

International Search Report & Written Opinion for PCT/EP2020/080686 mailed Jan. 27, 2021.

Wu Ming-Ju et al: "Wafer Map Failure Pattern Recognition and Similarity Ranking for Large-Scale Data Sets", Feb. 1, 2015, pp. 1-12, XP011571748.

Marino Kenneth et al; "The More You Know: Using Knowledge Graphs for Image Classification"; Carnegie Mellon University; 5000 Forbes Ave, Pittsburgh, PA 15213.

* cited by examiner

METHOD AND SYSTEM FOR ANOMALY DETECTION USING MULTIMODAL KNOWLEDGE GRAPH

CROSS-REFERENCE TO RELATED APPLICATIONS

This application claims priority to PCT Application No. PCT/EP2020/080686, having a filing date of Nov. 2, 2020, which claims priority to EP Application No. 19 206 513.4, having a filing date of Oct. 31, 2019, the entire contents both of which are hereby incorporated by reference.

FIELD OF TECHNOLOGY

The following generally relates to computer vision and more particularly relates to a method and system for anomaly detection using multimodal knowledge graph.

BACKGROUND

In general, object detection model incorporates a machine-learning mechanism that utilizes human knowledge in form of labeled data as an input. Since it is difficult to provide enough labeled data, considering from human levels to the machine-learning mechanism, the performance of the machine-learning mechanism is limited. Without sufficiently large datasets including labels, the machine-learning mechanism fails to detect the objects, which it is not trained on.

Zero-Shot Learning (ZSL) refers to a method for determining objects of new classes (unseen classes). For example, conventional object recognition methods need to predefine some classes (annotated labels, as described above), and then need to train the object detection model to recognize the objects in these classes. However, if there is an object in an unseen class, the model will fail to recognize it. ZSL is proposed to solve this problem.

According to the ZSL, the knowledge from seen classes is transferred to unseen classes. That is, a semantic space including the seen and unseen classes along with visual representation of the images/pictures that are projected and analysed. However, the ZSL, predominantly, is limited to classification of classes, instead of detecting the location of the objects in the image(s).

Thus, for constructing object detectors, the ZSL still requires annotated training images to train source classification models. For this purpose, the ZSL model is extended to object detection and focus on a Zero-Short Detection (ZSD) that requires zero examples for the unseen classes. However, the ZSD is not accurate without any prior information.

From the aforementioned reasoning, it is evident that one of the main shortcomings in existing object detection models is their requirements of high amount of training data to achieve good accuracy. In addition, a practical problem in extending machine-learning models to domain specific data is that the quality and quantity of annotated data is poor and can be expensive to obtain. Another problem is with the availability of sufficient training data in certain domains. It can also be noted that a lot of information/knowledge is available in the form of knowledge graphs such as manuals, standard operating procedures, expert blogs, prior knowledge or the like, but the existing object detection models are not able to use this valuable information to aid them in classification and detection of the objects.

SUMMARY

An aspect relates to a method and a system for anomaly detection using multimodal knowledge graph.

According to a first aspect, the object of the disclosure is achieved by a method for detecting anomalies associated with a plurality of data objects of a technical installation. The technical installation can include industrial plants, sites, monitoring and control areas, and the like. The plurality of data objects of the technical installation can include, for example industrial equipment(s), machinery, tools, components, devices, and the like. Without limiting to the technical installation, the plurality of data objects may also include data objects such as for example, a car, a tree, a cart, a road, and the like. The method comprises receiving a request to detect anomaly associated with the plurality of data objects in an image data. The image data can be a static image data and/or a dynamic image data. The static image data includes still image and the dynamic image data includes a sequence of image data, for example a video data, a multimedia data, a graphics interchange format (GIF), and the like. The method further comprises classifying the plurality of data objects using a multimodal knowledge graph. The multimodal knowledge graph comprises a plurality of pre-classified data objects, each of pre-classified data object is connected using one or more paths. The multimodal knowledge graph also comprises reference data along with the pre-classified data objects. The method additionally comprises detecting whether the anomaly exists in the plurality of classified data objects. The anomaly is detected by evaluating the plurality of classified data objects with the reference data corresponding to the plurality of classified data objects obtained from the multimodal knowledge graph. The anomaly can also be detected by evaluating the plurality of classified data objects with the pre-classified data objects and the reference data. The reference data includes a set of pre-defined rules, a standard operating procedure, a pre-defined activity or a process, and the like. The pre-classified data objects are the data objects which are already classified and information regarding these pre-classified data objects is available in the multimodal knowledge graph. The method additionally comprises generating a notification indicating the detected anomaly based on the evaluation. For example, a notification can be in a text or a graphical form indicating the detected anomaly.

In an embodiment, the method for classifying the plurality of data objects using the multimodal knowledge graph comprises receiving a first data corresponding to seen data classes (i.e., known classes/trained classes) of each data object from the plurality of data objects. Further, the method comprises identifying a second data corresponding to unseen data classes (i.e., unknown classes/untrained classes) associated of each data object from the plurality of data objects using the received first data. The method additionally comprises classifying the plurality of data objects using the first data and the second data.

In an embodiment, the method further comprises determining that the anomaly in the plurality of classified data objects fails to exist in the multimodal knowledge graph. Furthermore, the method comprises outputting the plurality of classified data objects on a display screen of an electronic device.

In an embodiment, the method comprises receiving an update request to update the one or more paths of the multimodal knowledge graph. The method additionally comprises classifying the plurality of data objects using the multimodal knowledge graph comprising the updated path.

The method additionally comprises detecting whether the anomaly exists in the plurality of classified data objects using the multimodal knowledge graph comprising the updated path, wherein the anomaly is detected by evaluating the plurality of classified data objects with the reference data corresponding to the plurality of classified data objects obtained from the multimodal knowledge graph comprising the updated path. The method additionally comprises generating a notification indicating the detected anomaly based on the evaluation and outputting the plurality of classified data objects on the display screen of the electronic device.

In an embodiment, the one or more paths of the multimodal knowledge graph is updated by adding a sequence of nodes and edges, wherein each node indicates a visual concept of the data object, and each edge indicates a relationship between the visual concepts among the plurality of data objects.

In an embodiment, the method further comprises generating one or more recommendations to rectify the detected anomaly. The one or more recommendations is generated by analysing similar detected anomaly in relation to the plurality of data objects obtained from the multimodal knowledge graph.

According to a second aspect, the object of the disclosure is achieved by a method for detecting anomalies associated with a plurality of data objects of a technical installation. The method comprising receiving a request to detect anomaly associated with the plurality of data objects obtained from an image data and sensor data. The sensor data is related to operating parameters of the data objects. For example, the sensor data includes operating pressure, operating temperature of a data object such as a pump. The sensor data may be analysed over time periods to determine anomaly. The image data comprises at least one of a static image data and a dynamic image data. The method comprises classifying the plurality of data objects using a multimodal knowledge graph, wherein the multimodal knowledge graph comprises a plurality of pre-classified data objects, each of pre-classified data object is connected using one or more paths. The method additionally comprises detecting whether the anomaly exists in the plurality of classified data objects, wherein the anomaly is detected by evaluating the plurality of classified data objects with reference data corresponding to the plurality of classified data objects obtained from the multimodal knowledge graph. The reference data includes a set of pre-defined rules, a standard operating procedure, a pre-defined activity or a process, and the like. Further, the method additionally comprises generating a notification indicating the detected anomaly based on the evaluation.

According to a third aspect, the object of the disclosure is achieved by a system for detecting anomalies associated with a plurality of data objects of a technical installation. The system comprising one or more processing units, a memory operatively coupled to the one or more processing units. The memory comprising an anomaly detection module configured to perform the embodiments of the method steps as described above.

According to a fourth aspect, the object of the disclosure is achieved by a computer program product (non-transitory computer readable storage medium having instructions, which when executed by a processor, perform actions) for detecting anomalies associated with a plurality of data objects of a technical installation. The computer program product includes a non-transitory storage medium readable by a processing circuit, the storage medium storing instructions executable by the processing circuit and configured to cause for execution of the method steps as described above.

BRIEF DESCRIPTION

Some of the embodiments will be described in detail, with reference to the following figures, wherein like designations denote like members, wherein.

DETAILED DESCRIPTION

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

Figure 1:
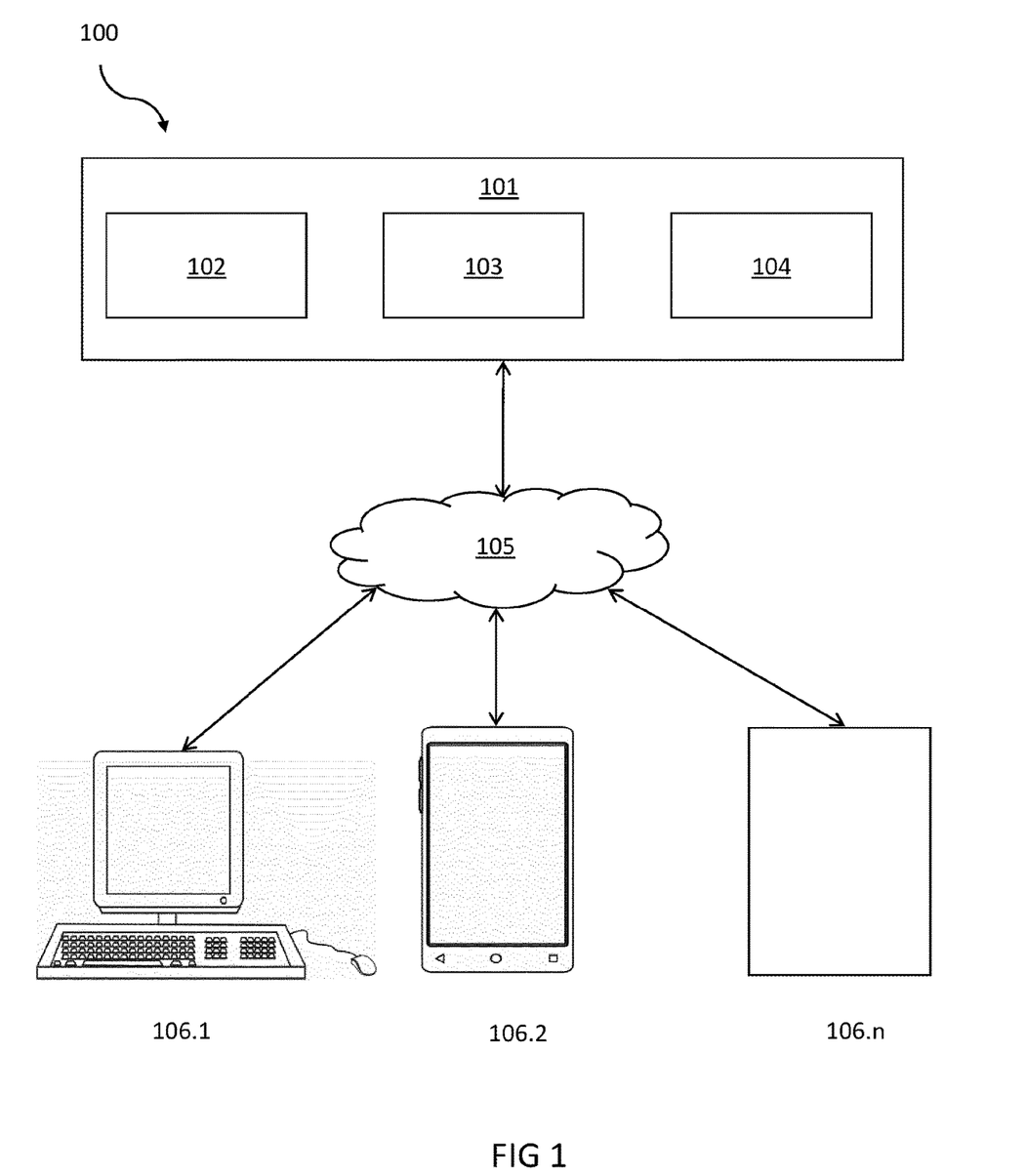
FIG. 1 illustrates a block diagram of a system, according to an embodiment of present invention.

FIG. 1 is a block diagram of a system 100, according to an embodiment of present invention.

The system 100 may include a server 101, a network(s) 105, and devices 106.1-106.n (hereinafter alternatively referred as electronic device 106). Further, the server 101 includes a database 102, an anomaly detection module 103, and a network interface(s) 104.

The server 101 communicates with the electronic device 106 using the network 105. The server 101 may include hardware, software, or firmware components. The database 102 includes a collection of image data comprising a plurality of data objects of a technical installation. The data objects can include, for example industrial equipment(s), machinery, tools, components, devices, and the like.

In an embodiment, the anomaly detection module 103 communicates with the database 102 to obtain the image data comprising the plurality of data objects. Alternatively, the anomaly detection module 103 may obtain the image data from a remote server or a cloud by communicating through the network interface 104.

Although not shown in FIG. 1, the server 101 includes a processor, a memory and a storage unit. The memory includes the anomaly detection module 103 stored in the form of machine-readable instructions executable by the processor. When executed by the processor, the anomaly detection module 103 causes the processor to detect whether the anomaly exists in the plurality of classified data objects by evaluating the plurality of classified data objects with the reference data corresponding to the plurality of classified data objects obtained from the multimodal knowledge graph. Method steps performed by the processor to achieve the above functionality are described in greater detail in FIGS. 3 and 4.

The electronic device 106 may be a device having a screen and capable of performing human-machine interaction, such as a mobile phone, notebook computer, tablet, desktop computer, virtual reality (VR) device, Augmented reality (AR) device, server, or the like. The electronic devices 106 are provided with input units and display units, respectively. Users of the electronic devices 106 can access the server 101 via a graphical user interface displayed on the respective display units. The graphical user interfaces may be specifically designed for accessing the anomaly detection module 103 in the server 101.

The network interface 104 via which the anomaly detection module 103 may communicate with one or more other devices or systems via the network 105. The network 105 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), cloud-based networks, or any other suitable private or public packet switched or circuit switched networks. Such network(s) may have any suitable communication range associated therewith and may include, for example, global networks (e.g., the Internet), metropolitan area networks (MANs), wide area networks (WANs), local area networks(LANs), or personal area networks (PANs).

In addition, the network interface 104 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an exemplary operation, the electronic device 106 may send the request to the server 101 to detect anomaly associated with the plurality of data objects in the image data. The processor in the server 101 receives the request from the electronic device 106. The processor obtains the image data comprising the plurality of data objects from the database 102. Further, the processor classifies the plurality of data objects using the multimodal knowledge graph which includes a plurality of pre-classified objects or known classification of the plurality of data objects. Thus, the processor in the server classifies the plurality of data objects obtained from the database 102, using the pre-classified objects in the multimodal knowledge graph. Accordingly, the processor in the server 101 detects whether the anomaly exists in the plurality of classified data objects, by evaluating the plurality of classified data objects with reference data corresponding to the plurality of classified data objects obtained from the multimodal knowledge graph. For example, the reference data includes a set of pre-defined rules, a standard operating procedure, a pre-defined activity or a process, and the like. The notification can be a text or in a graphical form indicating the detected anomaly. Additionally, the processor outputs the detected anomaly on the display unit of the electronic device 106. For example, the graphical user interface on the electronic device 106 may display the generated notification indicating the anomaly.

However, it should be noted that, in case if the anomaly detection fails to meet a threshold (i.e., threshold such as detection of the anomaly in predefined sequence of objects in the image data or persistence of anomaly for the sequence of the data objects in the image data) the processor fails to output or trigger the anomaly. Thereby, increasing the reliability of the detected anomaly, and avoiding the false triggering of the anomaly. In the system 100, a plurality of users can simultaneously validate whether the detected anomaly is a real anomaly or not by accessing the server 101 from the electronic device 106.

In case, if the processor determines that the anomaly in the plurality of classified objects fails to meet the threshold, the processor outputs only the plurality of classified data objects on the display screen of the electronic device 106.

In accordance with the foregoing description, the anomaly detection module 103 may be implemented in a cloud computing environment, wherein the anomaly detection module 103 is hosted on a cloud server. The various embodiments pertaining to the anomaly detection module 103 are described in later parts of description.

In an exemplary embodiment, the proposed method and system can be used for detection of the anomaly with respect to a manufacturing process in an industrial environment. The industrial environment may include various equipment, various sensors and controller(s) for monitoring the manufacturing process. For example, the industry may include food & beverage industries, equipment (i.e., electrical, mechanical, or the like) manufacturing industries and any such process automation industries. Consider a scenario in which the manufacturing process of the biscuits is examined to detect anomaly. For example, anomaly in terms of shape and quality of the biscuits. The anomaly detection module 103 obtains the image data from a camera source installed in the industrial environment, sensor data from various sensors monitoring the process and data from the controller (i.e., Programmable Logic Controller PLC), or the like. The data from the camera, sensors, and the controller can also be obtained from the database 102. Further, the obtained image data, the sensor data, and the data from the controller can be evaluated with reference data (i.e., reference shape or reference quality) stored in the multimodal knowledge graph. For example, a sample of ten biscuits may be compared with the reference shape to detect anomaly with respect to the shape of the biscuits being processed. Further, the sensor data can be processed to determine the anomaly associated with the quality of biscuits. In case of the anomaly detection, the anomaly detection module 103 can provide the notification to the user (i.e., plant engineer) and may also generate and indicate the one or more recommendations (available from the multimodal knowledge graph) to rectify the detected anomaly. The recommendations may include reduction or addition of some ingredients to achieve the desired quality of the biscuits.

Figure 2:
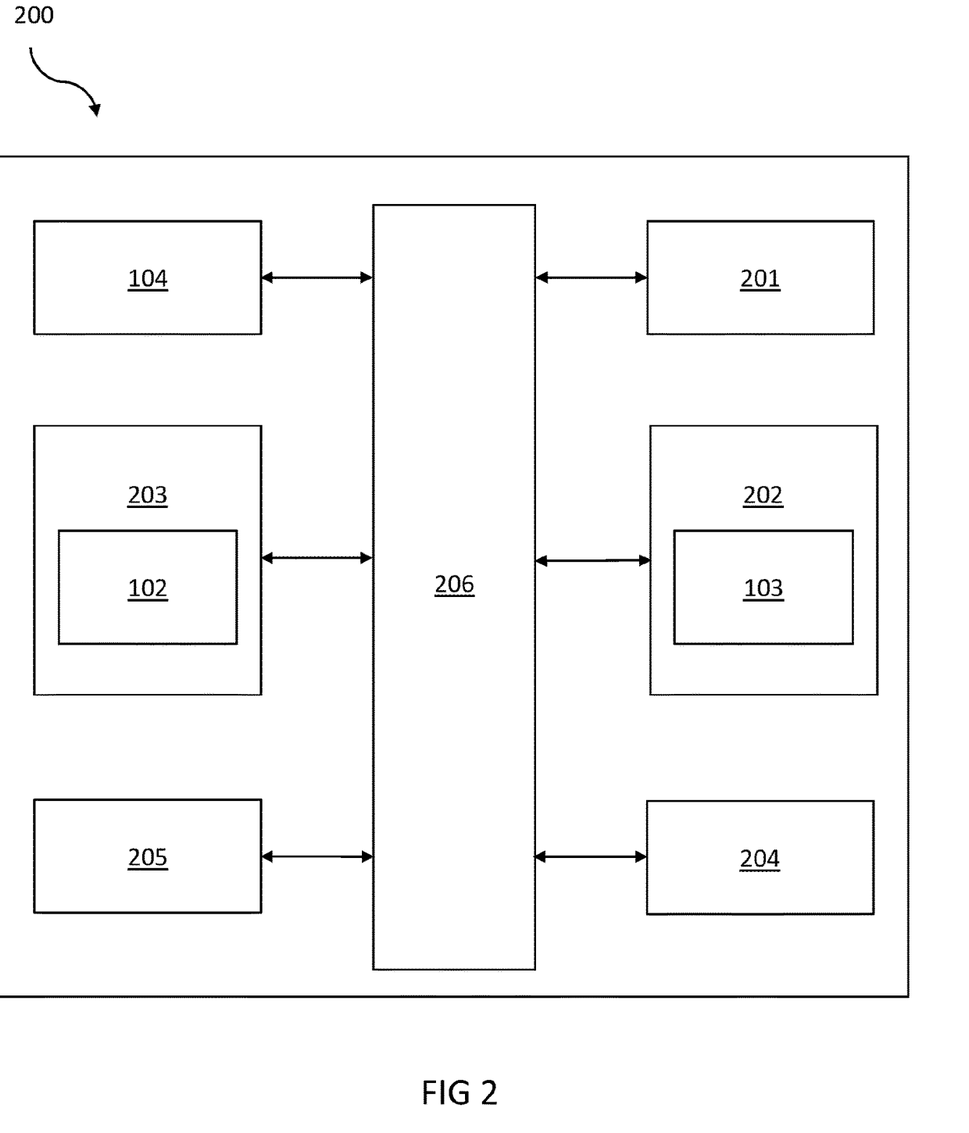
FIG. 2 illustrates a block diagram of an illustrative computing system for implementing one or more embodiments of the present invention.

FIG. 2 illustrates a block diagram of the illustrative computing system 200 for implementing one or more embodiments of the present invention.

The computing system 200 may include processing unit 201, one or more memory devices 202 (referred to herein as memory 202/memory unit 202), storage unit 203, an input unit 204, and an output unit 205. The system 200 may further include one or more buses 206 that functionally couple various components of the computing system 200.

The memory 202 may include volatile memory (memory that maintains its state when supplied with power) such as random-access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory. In certain example, the storage unit 203 may be equivalent to the memory 202. In various implementations, the memory 202 may include multiple different types of memory such as various types of static random-access memory (SRAM), various types of dynamic random-access memory (DRAM), various types of unalterable ROM, and/or writeable variants of ROM such as electrically erasable programmable read-only memory (EEPROM), flash memory, and so forth. The memory 202 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The storage unit 203 may include removable storage and/or non-removable storage including, but not limited to, magnetic storage, optical disk storage, and/or tape storage. The storage unit 203 may provide non-volatile storage of computer-executable instructions and other data. The storage unit 203 and the memory 202, removable and/or non-removable, are examples of computer-readable storage media (CRSM).

The storage unit 203 may store computer-executable code, instructions, or the like that may be loadable into the memory 202 and executable by the processing unit 201 to cause the processing unit 201 to perform or initiate various operations such as the operations required for detecting the anomaly associated with the plurality of data objects of the technical installation. The storage unit 203 may additionally store data (such as the image data, the sensor data, the controller data, and the like) that may be copied to memory 202 for use by the processing unit 201 during the execution of the computer-executable instructions. Moreover, output data generated as a result of execution of the computer-executable instructions by the processing unit 201 may be stored initially in memory 202 and may ultimately be copied to storage unit 203 for non-volatile storage.

More specifically, the storage unit 203 may store an operating systems (O/S); the database 102 configured to access the memory 202; and one or more program module, applications, engines, managers, computer-executable code, scripts, or the like such as, for example, the various modules of the anomaly detection module 103. Any of the components depicted as being stored in storage unit 203 may include any combination of software, firmware, and/or hardware. The software and/or firmware may include computer-executable instructions (e.g., computer-executable program code) that may be loaded into the memory 202 for execution by one or more of the processing unit 201 to perform any of the corresponding operations described earlier.

The processing unit 201 may be configured to access the memory 202 and execute computer-executable instructions loaded therein. For example, the processing unit 201 may be configured to execute computer-executable instructions of the various program module, applications, engines, managers, or the like of the anomaly detection module 103 to cause or facilitate various operations to be performed in accordance with one or more embodiments of the disclosure. The processing unit 201 may include any suitable processing unit capable of accepting data as input, processing the input data in accordance with stored computer-executable instructions, and generating output data. The processing unit 201 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processing unit 201 may have any suitable microarchitecture design that includes any number of constituent components such as, for example, registers, multiplexers, arithmetic logic units, cache controllers for controlling read/write operations to cache memory, branch predictors, or the like. The microarchitecture design of the processing unit 201 may be capable of supporting any of a variety of instruction sets.

The input unit 204 and the output unit 205 may facilitate the receipt of input information by the anomaly detection module 103 from one or more I/O devices as well as the output of information from the anomaly detection module 103 to the one or more I/O devices. The I/O devices may include any of a variety of components such as a display or a display screen having a touch surface or a touchscreen; an audio output device for producing sound, such as a speaker; an audio capture device, such as a microphone; an image and/or video capture device, such as a camera; a haptic unit; and so forth. Any of these components may be integrated into the components of the computing system 200 or only into the anomaly detection module 103 or may be separate. The I/O devices may further include, for example, any number of peripheral devices such as data storage devices, printing devices, and so forth. The input unit 204 and the output unit 205 may also include an I/O interface for an external peripheral device connection such as universal serial bus (USB), FireWire, Thunderbolt, Ethernet port or other connection protocol that may connect to one or more networks.

The I/O interface(s) may also include a connection to one or more antennas to connect to one or more networks via a wireless local area network (WLAN) (such as WiFi) radio, Bluetooth, and/or a wireless network radio, such as a radio capable of communication with a wireless communication network such as a Long-Term Evolution (LTE) network, WiMAX network, 3G network, etc.

The bus(es) 206 may include at least one of a system bus, a memory bus, an address bus, or a message bus, and may permit the exchange of information (e.g., data (including computer-executable code), signaling, etc.) between various components of the anomaly detection module 103. The bus(es) 206 may include, without limitation, a memory bus or a memory controller, a peripheral bus, an accelerated graphics port, and so forth.

Figure 3:
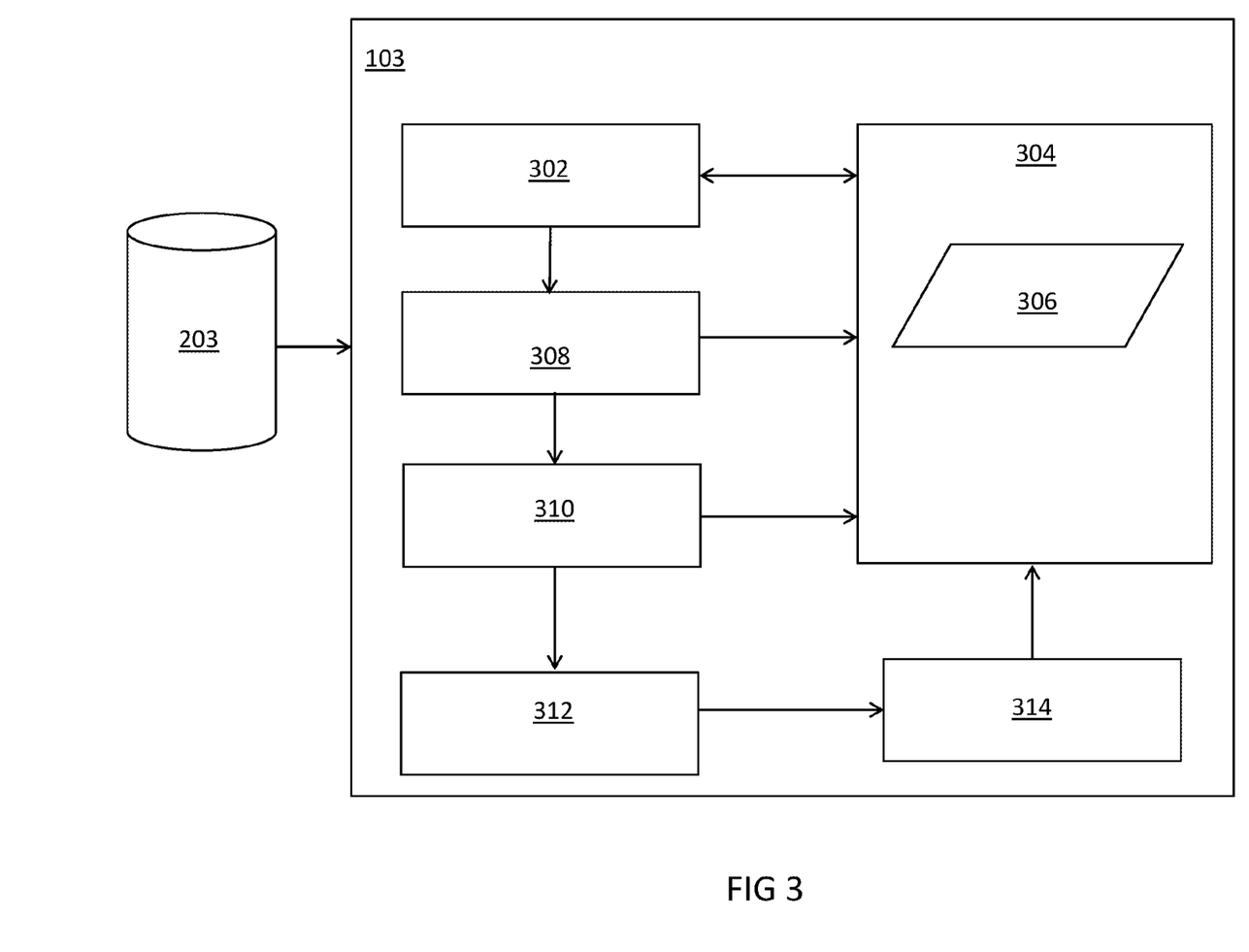
FIG. 3 illustrates various components of an anomaly detection module as shown in FIG. 2, according to an embodiment of the present invention.

FIG. 3 illustrates various components of the anomaly detection module 103, according to an embodiment of the present invention.

As depicted in FIG. 3, the anomaly detection module 103 comprises a classification module(s) 302, a multimodal knowledge base module(s) 304, an object detection module (s) 308, an evaluation module(s) 310, a recommendation engine 312, a reinforcement-learning module(s) 314, and the storage unit 203. The multimodal knowledge base module(s) 304 incorporates a multimodal knowledge graph 306. For example, the multimodal knowledge graph 306 can be either locally stored in the memory 202 or can be retrieved from the storage unit 203. The classification module 302, the multimodal knowledge base module 304, the object detection module 308, the multimodal knowledge graph 306, the evaluation module(s) 310, the recommendation engine 312, and the reinforcement-learning module 314, may take a form of hardware such as the processing unit 201 with embedded software, or a computer program in the form machine-readable instructions stored on a computer program product (e.g., the memory unit 202) and executable by the processing unit 201.

The anomaly detection module 103 can be configured to receive the request from the electronic device 106 to detect anomaly associated with the plurality of data objects in the image data which includes the static image data and the dynamic image data. The request may be received by the anomaly detection module 103 through a suitable communication protocol. For example, the image data can be obtained from the storage unit 203 or can be directly obtained from any runtime applications (e.g., camera) without being stored in the storage unit 203. For example, the image data may be a graphical representation of the media files (e.g., videos) or images associated with media files (e.g., album), multimedia files, or the like.

The objects in the image data may be of same or different classes and the objects may be structured objects such as car or unstructured objects such as sky. Partially occluded objects may also be present in the image data.

In an embodiment, the classification module 302 can be configured to detect the number of data objects in the image data, for example, data object-1, data object-2, data object 3 and so on to data object "N". Further, the classification module 302 can be configured to classify the data objects of known classes (i.e., seen classes from the identified objects) from the image data. The classification module 302 can be configured to classify the data objects of unknown classes (i.e., unseen classes from the identified objects) using the multimodal knowledge graph 306.

In an embodiment, the classification module 302 can be configured to classify the plurality of data objects in the image data using the pre-classified objects available in the multimodal knowledge graph 306. In an exemplary embodiment, the multimodal knowledge graph 306 includes numerical features in the form of graph structure, visual data/concepts in the form of graph structure, knowledge about the data objects, classification of objects belonging to both seen classes and unseen classes, system design, manuals, state-of the art procedures, or the like, in form of graph structure. The path in multimodal knowledge graph 306 indicates relations between nodes and edges of the multimodal knowledge graph 306. In certain example embodiments, the visual concepts in the multimodal knowledge graph 306 are represented as nodes and the relationships between them as edges.

Further, the multimodal knowledge base module 304 communicates with the object detection module 308 in that the output from the object detection module 308 is received as input to the multimodal knowledge base module 304 comprising the multimodal knowledge graph 306.

In certain example embodiments, the object detection module 308 may be configured to detect the data objects using two steps, a training step and a detection step. In the training step, the object detection module 308 can be trained using training samples to adjust parameters of the object detection module 308. The training samples may include images of data objects belonging to certain class (such as humans, buildings or cars), pixel of the images, and pattern of objects such as edges, horizontal edges, round shapes or the like, present in the image data. The classes of data objects used during the training step are known as seen classes and the classes of objects which are not used during the training step are known as unseen classes. Subsequent to the training step, the object detection module 308 can be configured to detect the data objects i.e., corresponding to both seen and unseen classes in the detection step. Thus, the object detection module 308 detects the data objects in the image data.

Further, the evaluation module 310 can be configured to evaluate (or compare) the plurality of classified data objects with the reference data corresponding to the plurality of classified data objects obtained from the multimodal knowledge graph 306. The reference data includes a set of pre-defined rules, a standard operating procedure, a pre-defined activity or a process, and the like. For example, the evaluation module 310 can be configured to evaluate whether the detected anomaly in the plurality of classified data objects (i.e., when the classified data objects are compared/evaluated with the reference data) meets the threshold value. For example, the threshold value can be a pre-determined value (for example, 0.8). In case, if it is determined that the detected anomaly in the plurality of classified data objects meets the threshold value, then the evaluation module 310 can be configured to detect the anomaly in the plurality of classified data objects.

In an embodiment, the evaluation module 310 can be configured to generate the notification, such as for example a text or in a graphical form, indicating the detected anomaly.

In another embodiment, if the evaluation module 310 determines that there is no anomaly in the plurality of classified data objects, then the evaluation module 310 can be configured to trigger a display unit of the electronic device to output the plurality of classified data objects on the display screen of the electronic device 106.

The recommendation engine 312 can be configured to generate one or more recommendations to rectify the detected anomaly. For example, the one or more recommendations may be generated by analysing similar detected anomaly in relation to the plurality of data objects and determining the solutions/recommendation used to rectify the detected anomaly from the multimodal knowledge graph 306.

In an embodiment, the reinforcement-learning module 314 can be configured to receive an update request from the electronic device 106 to update path(s) of the multimodal knowledge graph 306. Upon receiving the update request from the electronic device 106, the one or more paths of the multimodal knowledge graph 306 are updated. Thus, the one or more paths of the multimodal knowledge graph 306 are updated by adding a sequence of nodes and edges, wherein each node indicates a visual concept of the plurality of objects and each edge indicates a relationship between the visual concepts of the plurality of objects.

With the updated paths in the multimodal knowledge graph 306, the anomaly detection module 103 detects whether the anomaly exists in the classified data objects using the multimodal knowledge graph 306 with the updated path. Further, the evaluation module 310 can be configured to generate a notification as a text or in a graphical form indicating the detected anomaly.

Example embodiments of the disclosure incorporates the knowledge obtained from the multimodal knowledge graph 306 to determine the anomaly within the industrial environment. Since the training data set in the industrial environment is limited, the present disclosure describes the use of the multimodal knowledge graph 306 to determine the industrial objects and to detect the anomalies associated with the industrial objects. Further, the present disclosure describes a reasoning-based model to forecast the unforeseen actions using the multimodal knowledge graph 306.

Figure 4:
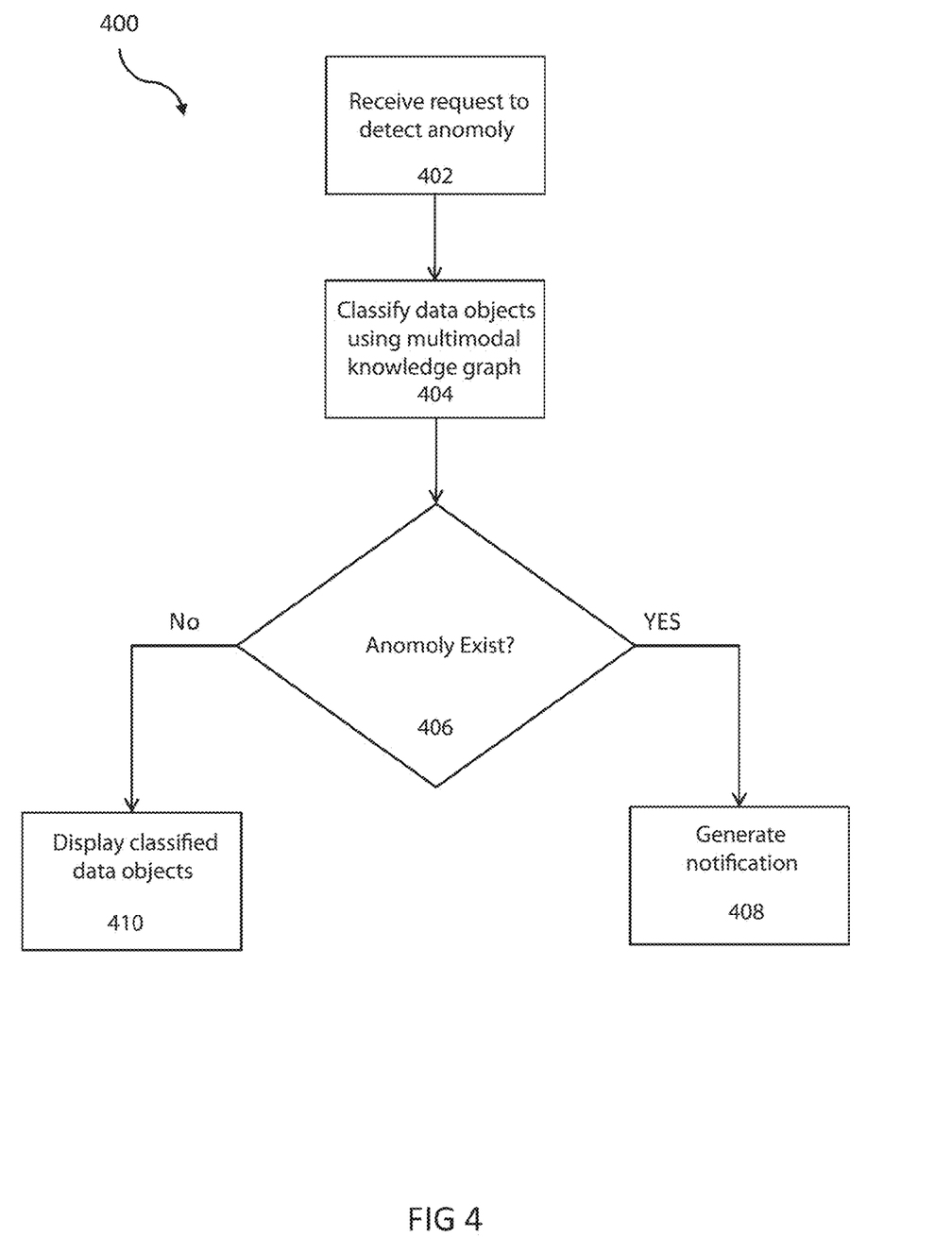
FIG. 4 is a flow diagram illustrating an exemplary detecting anomaly associated with a plurality of data objects of a technical installation, according to an embodiment of the present invention.

FIG. 4 is a flow diagram 400 illustrating a process for detecting anomalies associated with the plurality of data objects using the technical installation, according to an embodiment of the present invention.

At step 402, the request to detect anomaly associated with the plurality of data objects in the image data is received.

At step 404, the plurality of data objects are classified using the multimodal knowledge graph 306. The multimodal knowledge graph 306 includes the plurality of pre-classified data objects, where each of the pre-classified object is connected using the one or more paths. For example, the data objects (i.e., the first objects/the second objects) from the image data are detected. The data objects can be classified using the classification (i.e., the seen classes) of the data objects. The untrained classifications (i.e., the unseen classes) of the objects can be derived using the multimodal knowledge graph 306.

At step 406, it is detected whether the anomaly exists in the plurality of classified data objects. In an embodiment, the anomaly is detected by evaluating the plurality of classified data objects with the reference data corresponding to the plurality of classified data objects obtained from the multimodal knowledge graph 306. If it is determined that the anomaly exists, then at step 408, the notification indicating the detected anomaly is generated.

If it is determined that the anomaly fails to exist in the plurality of data objects, then at step 410, the plurality of classified data objects are displayed on the screen of the electronic device 106.

Figure 5:
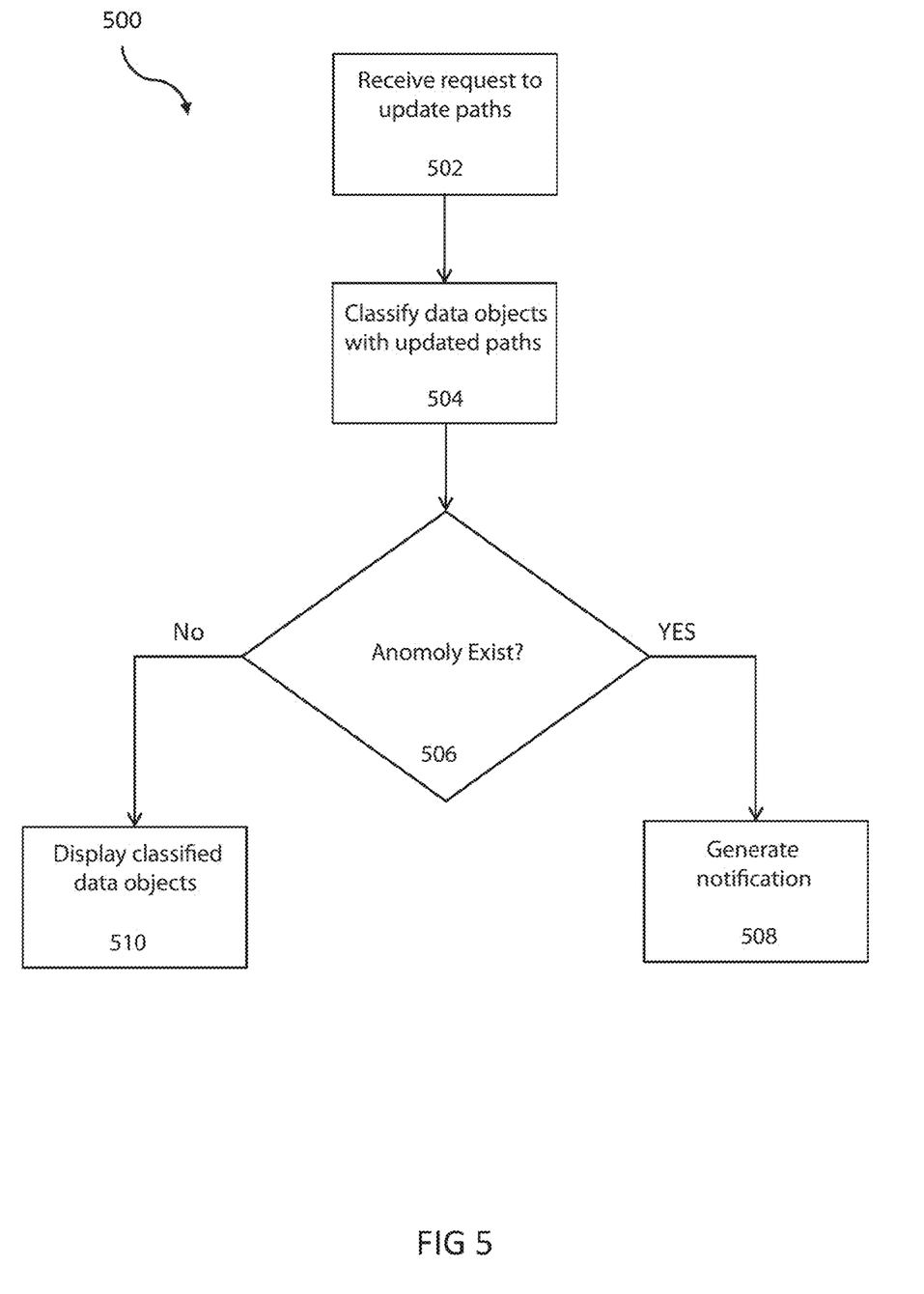
FIG. 5 is a flow diagram illustrating a process for updating the multimodal knowledge graph, according to an embodiment of the present invention.

FIG. 5 is a flow diagram 500 illustrating the process for updating the multimodal knowledge graph 306, according to the embodiment of the present invention.

At step 502, the update request to update the one or more paths of the multimodal knowledge graph 306 is received.

At step 504, the plurality of data objects are classified using the multimodal knowledge graph 306 comprising the one or more updated paths.

At step 506, it is detected whether the anomaly exists in the plurality of classified data objects. In an embodiment, the anomaly is detected by evaluating the plurality of classified data objects with the reference data corresponding to the plurality of classified data objects obtained from the multimodal knowledge graph 306 comprising the one or more updated paths. If it is determined that the anomaly exists, then at step 508, the notification indicating the detected anomaly is generated.

If it is determined that the anomaly fails to exist in the plurality of data objects, then at step 510, the plurality of classified data objects are displayed on the screen of the electronic device 106.

Figure 6:
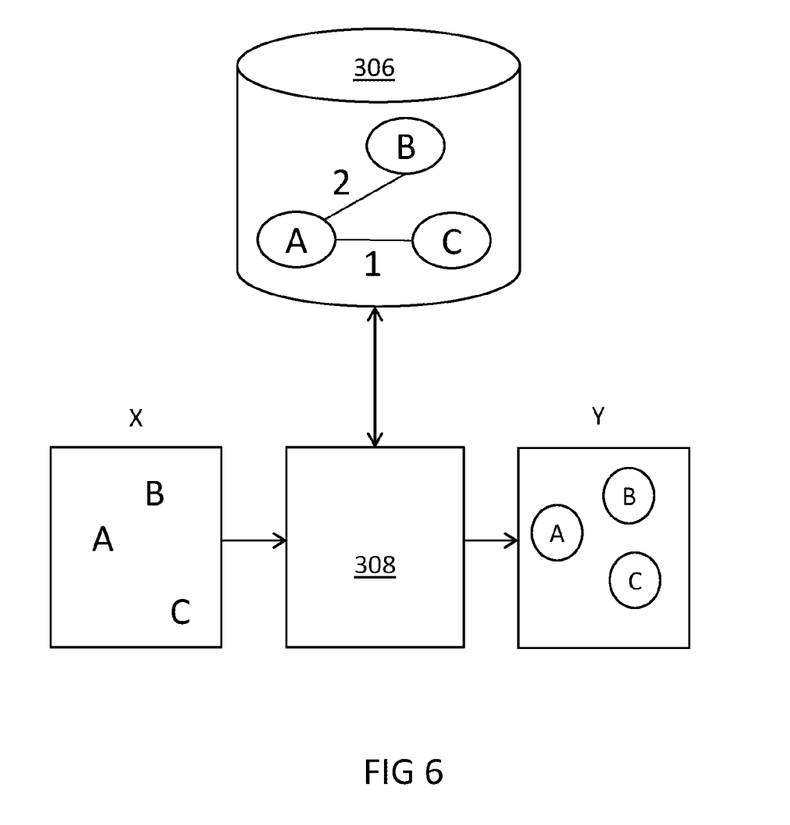
FIG. 6 illustrates an example scenario of the reinforcement learning using the multimodal knowledge graph, according to an embodiment of the present invention.

FIG. 6 illustrates an example scenario of the reinforcement learning module 314 using the multimodal knowledge graph 306 according to an embodiment of the present invention.

For example, consider the image data "X" comprising multiple objects such as object "A", object "B" and object "C" and that the objects "A" & "B" exist in the image data "X" but are not connected in the multimodal knowledge graph 306 (or the walk length between them is high). Initially, say "A" and "C" were classified (path-1), and "B" was suppressed. This is because, the multimodal knowledge graph 306 estimates that these two objects "A" & "B" cannot occur together. In case of the conventional learning-based model, the object "B" will never be detected, as there is no way a system would know the classification is wrong. Unlike the conventional learning-based model, the feedback can be provided using the reinforcement learning module 314, indicating to predict the one or more paths in the multimodal knowledge graph 306 using the association/classification (i.e., contextual based association) between objects "A" and "C". Thus, a new path (path-2) is created in the multimodal knowledge graph 306 using the association/classification between objects "A" and "B". The information regarding path-2 is provided to the object detection module 308, which then recomputes the classifications and detects the objects ("A", B" and "C") as shown in image data "Y".

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for detecting anomalies associated with a plurality of data objects of a technical installation, the method comprising:

receiving a request to detect an anomaly associated with the plurality of data objects in an image data, wherein the image data comprises at least one of a static image data and a dynamic image data;

classifying the plurality of data objects using a multimodal knowledge graph, wherein the multimodal knowledge graph comprises a plurality of pre-classified data objects, each pre-classified data object being connected to at least one further pre-classified data object of the multimodal knowledge graph using one or more paths according to relations between pre-classified data objects;

detecting whether the anomaly exists in the plurality of classified data objects, wherein the anomaly is detected by evaluating the plurality of classified data objects with regard to reference data corresponding to the plurality of classified data objects obtained from the multimodal knowledge graph;

generating a notification on a display screen of an electronic device in a text or graphical form indicating the anomaly based on the evaluating;

determining that the anomaly in the plurality of classified data objects fails to exist;

outputting the plurality of classified data objects on the display screen of the electronic device;

receiving an update request to update the one or more paths of the multimodal knowledge graph;

classifying the plurality of data objects using the multimodal knowledge graph comprising the updated path;

detecting whether the anomaly exists in the plurality of classified data objects using the multimodal knowledge graph comprising the updated path, wherein the anomaly is detected by evaluating the plurality of classified data objects with the reference data corresponding to the plurality of classified data objects obtained from the multimodal knowledge graph comprising the updated path; and generating a notification on the display screen of the electronic device in a text or graphical form indicating the detected anomaly based on the evaluating the plurality of classified data objects with the reference data corresponding to the plurality of classified data objects obtained from the multimodal knowledge graph comprising the updated path.

2. The method of claim 1, wherein classifying the plurality of data objects using the multimodal knowledge graph comprises:

receiving first data corresponding to seen data classes of each data object from the plurality of data objects;

identifying second data corresponding to unseen data classes associated of each data object from the plurality of data objects using the first data; and classifying the plurality of data objects using the first data and the second data.

3. The method of claim 1, further comprising:

outputting the plurality of classified data objects on the display screen of the electronic device.

4. The method of claim 1, wherein the one or more paths of the multimodal knowledge graph is updated by adding a sequence of nodes and edges, further wherein each node indicates a visual concept of the plurality of objects and each edge indicates a relationship between the visual concepts of the plurality of objects.

5. The method of claim 1, wherein the method further comprising:

generating one or more recommendations to rectify the detected anomaly, wherein the one or more recommendations is generated by analysing similar detected anomaly in relation to the plurality of data objects obtained from the multimodal knowledge graph.

6. A system for detection of anomalies associated with a plurality of data objects of a technical installation, the system comprising one or more processing units, a memory operatively coupled to the one or more processing units, the memory comprising an anomaly detection module configured to perform at least one of the steps as claimed in claim 1.

7. A computer program product, comprising a computer readable hardware storage device having computer readable program code stored therein, said program code executable by a processor of a computer system to implement a method according to claim 1.

8. A method for detecting anomalies associated with a plurality of data objects of a technical installation, the method comprising:

receiving a request to detect an anomaly associated with the plurality of data objects obtained from an image data and a sensor data, wherein the image data comprises at least one of a static image data and a dynamic image data;

classifying the plurality of data objects using a multimodal knowledge graph, wherein the multimodal knowledge graph comprises a plurality of pre-classified data objects, each of pre-classified data object being connected to at least one further pre-classified data object of the multimodal knowledge graph using one or more paths according to relations between pre-classified data objects;

detecting whether the anomaly exists in the plurality of classified data objects, wherein the anomaly is detected by evaluating the plurality of classified data objects with reference data corresponding to the plurality of classified data objects obtained from the multimodal knowledge graph;

generating a notification on a graphical user interface in a text or graphical form indicating the detected anomaly based on the evaluating;

determining that the anomaly in the plurality of classified data objects fails to exist;

outputting the plurality of classified data objects on a display screen of an electronic device;

receiving an update request to update the one or more paths of the multimodal knowledge graph;

classifying the plurality of data objects using the multimodal knowledge graph comprising the updated path;

detecting whether the anomaly exists in the plurality of classified data objects using the multimodal knowledge graph comprising the updated path, wherein the anomaly is detected by evaluating the plurality of classified data objects with the reference data corresponding to the plurality of classified data objects obtained from the multimodal knowledge graph comprising the updated path; and generating a notification on the display screen of the electronic device in a text or graphical form indicating the detected anomaly based on the evaluating the plurality of classified data objects with the reference data corresponding to the plurality of classified data objects obtained from the multimodal knowledge graph comprising the updated path.

9. The method of claim 8, wherein the sensor data is obtained from a plurality of sensors and controller attached to the technical installation.

* * * * *